United States Patent
Yu (10) Patent No.: US 9,746,969 B2
(45) Date of Patent: Aug. 29, 2017

(54) FLAT PANEL ELECTRONIC DEVICE HAVING A SUPPORTING APPARATUS FOR SUPPORTING DIFFERENT POSITIONS

(71) Applicant: NVIDIA CORPORATION, Santa Clara, CA (US)

(72) Inventor: Mingyi Yu, Shenzhen (CN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/864,835

(22) Filed: Apr. 17, 2013

(65) Prior Publication Data

US 2014/0218332 A1    Aug. 7, 2014

(30) Foreign Application Priority Data

Feb. 6, 2013   (CN) .......................... 2013 1 0048067

(51) Int. Cl.
| | |
|---|---|
| *G06F 3/02* | (2006.01) |
| *G09G 5/00* | (2006.01) |
| *G06F 3/044* | (2006.01) |
| *G06F 1/16* | (2006.01) |

(52) U.S. Cl.
CPC .............. *G06F 3/044* (2013.01); *G06F 1/166* (2013.01)

(58) Field of Classification Search
CPC ................................ G06F 3/044; G09G 5/006
USPC ......................................................... 345/169
See application file for complete search history.

(56) References Cited

U.S. PATENT DOCUMENTS

| | | | | |
|---|---|---|---|---|
| 2004/0204150 | A1* | 10/2004 | Cho .............................. | 455/567 |
| 2006/0256075 | A1* | 11/2006 | Anastas et al. ............... | 345/156 |
| 2011/0045803 | A1* | 2/2011 | Kim et al. .................. | 455/412.2 |

FOREIGN PATENT DOCUMENTS

| | | |
|---|---|---|
| CN | 1987720 A | 6/2007 |
| CN | 101592772 A | 12/2009 |
| CN | 101598935 A | 12/2009 |
| CN | 102484496 A | 5/2012 |
| CN | 103327769 A | 9/2013 |

\* cited by examiner

*Primary Examiner* — Long D Pham
(74) *Attorney, Agent, or Firm* — Artegis Law Group, LLP (57) ABSTRACT

A flat panel electronic device is presented. The flat panel electronic device comprises an actuating apparatus, a supporting apparatus and a control apparatus. The actuating apparatus is configured to generate a first actuating signal. The supporting apparatus has an extending position and an initial position, wherein the supporting apparatus is configured to support at least a portion of the flat panel electronic device to a predetermined height when the supporting apparatus is in the extending position. The control apparatus is configured to control the movement of the supporting apparatus in response to the first actuating signal. In addition, the supporting apparatus can also have an additional function for adjusting the angle of the display panel of the flat panel electronic device with respect to the user, so as to improve the comfort level for watching.

23 Claims, 4 Drawing Sheets

FLAT PANEL ELECTRONIC DEVICE HAVING A SUPPORTING APPARATUS FOR SUPPORTING DIFFERENT POSITIONS

CROSS-REFERENCE TO RELATED APPLICATIONS

This application is based on and claims benefit of priority from Chinese Patent Application 201310048067.8, filed on Feb. 6, 2013, which is hereby incorporated herein by reference.

BACKGROUND OF THE INVENTION

Field of the Invention

The present invention relates generally to the field of electronic devices and more particularly to flat panel electronic devices.

With the development of science and technology, the present flat panel electronic devices, for example, tablet PCs, flat panel mobile phones, etc., become thinner. When the flat panel electronic devices are placed on the planes, such as tables, it is difficult to pick them up without depending on other apparatuses.

SUMMARY OF THE INVENTION

Accordingly, there is a need for providing a flat panel electronic device to address the problem in the prior art.

In one embodiment, a flat panel electronic device is disclosed. The flat panel electronic device comprises an actuating apparatus. The actuating apparatus is operable to generate a first actuating signal. The flat panel electronic device also comprises a supporting apparatus. The supporting apparatus has an extending position and an initial position, wherein the supporting apparatus is configured to support at least a portion of the flat panel electronic device to a predetermined height when in the extending position. Finally, the flat panel electronic device comprises a control apparatus. The control apparatus is operable to control the supporting apparatus to move to the extending position in response to the first actuating signal.

Preferably, the actuating apparatus is operable to detect the presence of an input apparatus and generate the first actuating signal when the input apparatus enters a detectable region proximate to the flat panel electronic device.

Preferably, the flat panel electronic device further comprises a state switching apparatus, and the state switching apparatus is operable to switch the supporting apparatus between an operable state and a non-operable state, wherein the control apparatus is operable to disable the first actuating signal when the supporting apparatus is in the non-operable state.

Preferably, the supporting apparatus is operable manually when in the non-operable state.

Preferably, the flat panel electronic device further comprises a level detecting apparatus, and the level detecting apparatus is operable to detect an angle between the flat panel electronic device and a horizontal, wherein the control apparatus is operable to disable the first actuating signal when the angle is more than or equal to an predetermined angle.

Preferably, the predetermined angle is 5°-15°.

Preferably, the level detecting apparatus is selected from the group comprising a gyro sensor, a gravity sensor and an acceleration sensor.

Preferably, the detectable region comprises a designated region above a display panel of the flat panel electronic device.

Preferably, the actuating apparatus is operable to generate the first actuating signal when the input apparatus contacts the display panel in the designated region.

Preferably, the detectable region is a region that is away from the flat panel electronic device within a predetermined distance, wherein the predetermined distance is 1 cm-3 cm.

Preferably, the actuating apparatus is selected from the group comprising an infrared sensor, a magnetic sensor and a capacitive sensor.

Preferably, the actuating apparatus is operated manually by a user to generate the first actuating signal.

Preferably, the actuating apparatus is operated manually by the user to generate a second actuating signal, and the control apparatus is operable to receive the second actuating signal so as to control the supporting apparatus to return to the initial position.

Preferably, the flat panel electronic device further comprises a motion detecting apparatus, wherein the motion detecting apparatus is operable to detect motion of the flat panel electronic device and generate a second actuating signal when a time of the motion is greater than or equal to a predetermined time, and wherein the control apparatus is operable to receive the second actuating signal so as to control the supporting apparatus to return to the initial position.

Preferably, the predetermined time is 0.5 s-2 s.

Preferably, the motion detecting apparatus comprises an acceleration sensor.

Preferably, the acceleration sensor is operable to detect an acceleration of the flat panel electronic device, and the acceleration sensor is operable to determine that the flat panel electronic device is moving when the acceleration is in a predetermined range.

Preferably, the supporting apparatus comprises a permanent magnet and the control apparatus comprises an electromagnet, wherein a pole of the permanent magnet is close to a pole of the electromagnet, and wherein the electromagnet is operable to repel the permanent magnet when a forward current flows therethrough and attract the permanent magnet when a reverse current flows therethrough.

Preferably, the supporting apparatus comprises a speaker, and the permanent magnet is a magnet in the speaker.

Preferably, the control apparatus comprises a vibrating motor disposed in the flat panel electronic device.

By means of responding to the actuating signal and controlling the supporting apparatus to support at least a portion of the flat panel electronic device to a certain height, the flat panel electronic device can be picked up conveniently from the placed plane as desired. In addition, the supporting apparatus can also have an additional function for adjusting the angle of the display panel of the flat panel electronic device with respect to the user, so as to improve the comfort level for watching.

Advantages and features of the present invention will be described in detail below in connection with the accompanying drawings.

BRIEF DESCRIPTION OF THE DRAWINGS

In order that the advantages of the invention will be readily understood, a more detailed description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

In the following discussion, details are presented so as to provide a more thorough understanding of the present invention. However, the present invention may be implemented without one or more of these details as would be apparent to one of ordinary skill in the art. Certain examples are illustrated without elaborate discussion of technical features that would be within the purview of one of ordinary skill in the art so as to avoid confusion with the present invention.

Figure 1:
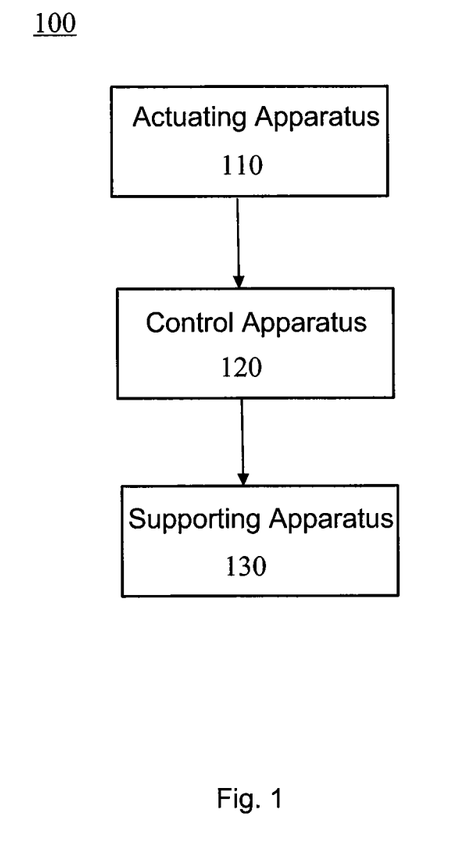
FIG. 1 is a schematic block diagram of the flat panel electronic device in accordance with one embodiment of the invention.

In order for a user to pick up the flat panel electronic device placed on a plane conveniently as desired, the invention discloses a flat panel electronic device. FIG. 1 is a schematic block diagram of the flat panel electronic device in accordance with the first embodiment of the invention. As shown in FIG. 1, the flat panel electronic device 100 comprises an actuating apparatus 110, a supporting apparatus 130 and a control apparatus 120.

The actuating apparatus 110 is operable to generate a first actuating signal. In one embodiment, the actuating apparatus 110 may be operable such that an actuating operation is manually performed by the user to generate the first actuating signal when the user wants to pick up the flat panel electronic device 100. In another embodiment, the actuating apparatus 110 is operable such that the actuating operation is performed automatically when the user wants to pick up the flat panel electronic device 100. The actuating apparatus 110 will be described in detail below.

The supporting apparatus 130 has an extending position and an initial position. The supporting apparatus 130 can be disposed at any position of the flat panel electronic device 100, in the case that the supporting apparatus 130 is configured to support at least a portion of the flat panel electronic device 100 to a predetermined height when in the extending position. The predetermined height is the distance between a placed plane and the portion of the flat panel electronic device 100 that is farthest from the placed plane. The portion that is farthest from the placed plane is usually the edge of the flat panel electronic device 100. In this way, the flat panel electronic device 100 may be picked up easily when it is placed on the plane. As an example, the supporting apparatus 130 is disposed on the rear cover of the flat panel electronic device 100. In one preferred embodiment, the supporting apparatus 130 may be contained in the flat panel electronic device 100 when in the initial position, so as to avoid the volume of the flat panel electronic device from increasing. In addition, in order for the user to pick up the flat panel electronic device 100 conveniently, the predetermined height supported by the supporting apparatus 130 may be 0.5 cm, 0.6 cm, 0.7 cm, 0.8 cm, 0.9 cm, 1.0 cm or more. Moreover, the supporting apparatus 130 also provides an additional function. When the flat panel electronic device is placed on the placed plane, the angle of the display panel with respect to the user can also be adjusted by the supporting apparatus 130. Thus the supporting apparatus 130 can also be of benefit to watching. However, in view of the additional function of the supporting apparatus 130, those skilled in the art may select a relatively higher predetermined height as appropriate, such that a suitable angle can be formed between the display panel and the placed plane.

The control apparatus 120 is operable to control the supporting apparatus 130 to move to the extending position in response to the aforementioned first actuating signal generated by the actuating apparatus 110. Specifically, when the user wants to pick up the flat panel electronic device 100 placed on the plane, the actuating apparatus 110 can be actuated such that the first actuating signal is generated and then transmitted to the control apparatus 120. The control apparatus 120 controls the supporting apparatus 130 to move to the extending position in response to the first actuating signal, and thus at least a portion of the flat panel electronic device 100 is supported to the predetermined height. In this way, the user can pick up the flat panel electronic device 100 effortlessly when it is placed on the plane.

In one embodiment, the actuating apparatus 110 may be configured as a sensing apparatus, which can generate the first actuating signal through automatically detecting the proximity of the input apparatus, such as a finger of the user or a stylus, etc. Herein, one object being proximate to the other object means the distance between them is more than or equal to 0 and less than or equal to a predetermined value. In one preferred embodiment, the actuating apparatus 110 is operable to automatically detect the presence of the input apparatus and generate the first actuating signal when the input apparatus enters a detectable region proximate to the flat panel electronic device 100. In practice, it is simply required that the input apparatus enters the detectable region of the actuating apparatus 110. The actuating apparatus 110 can automatically detect the presence of the input apparatus and generate the first actuating signal. The control apparatus 120 may control the supporting apparatus 130 to move to the extending position in response to the first actuating signal. In this way, when a hand of the user moves to contact the flat panel electronic device 100, at least a portion of the flat panel electronic device 100 has been supported to the predetermined height by the supporting apparatus 130, or the user only needs to wait a short time before the supporting apparatus 130 completes the supporting operation. Accordingly, it shortens the waiting time for the user and improves the convenience of use.

The detectable region is a region that is away from the flat panel electronic device 100 within a predetermined distance. Preferably, the predetermined distance may be 1 cm-3 cm. In one embodiment, the predetermined distance may be a value which is set to factory default levels. It can be suitably chosen from the aforementioned range by those skilled in the art according to the actual situation. In another embodiment, the predetermined distance may be set by the user at any time, if needed or desired. Of course, other appropriate distances can also achieve the purpose of the invention. It is preferable that the predetermined distance is not too large. Otherwise, the control apparatus 120 is possible to control the supporting apparatus 130 to support the flat panel electronic device 100 in response to the first actuating signal generated by the actuating apparatus 110, even in the case that the user does not intend to pick up the flat panel electronic device 100 and spaces from the flat panel electronic device 100 in a distance. This causes the unnecessary consumption of the power.

Figure 2:
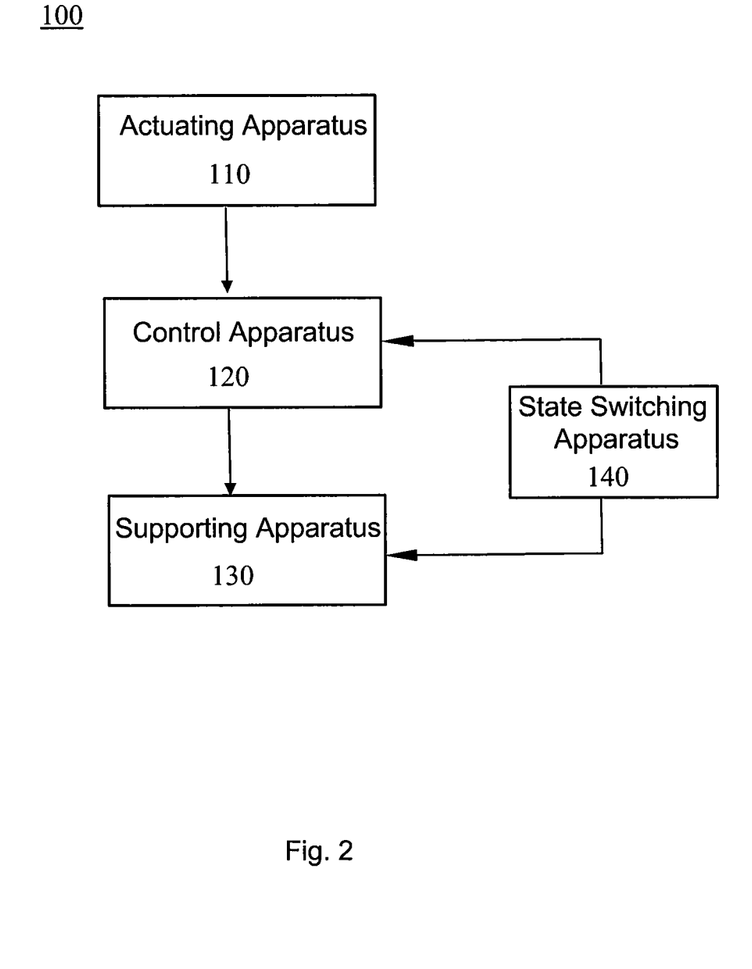
FIG. 2 is a schematic block diagram of the flat panel electronic device in accordance with another embodiment of the invention.

As mentioned above, when the input apparatus enters the detectable region proximate to the flat panel electronic device 100, the control apparatus 120 may control the supporting apparatus 130 to move to the extending position and support the flat panel electronic device 100. However, in practice, it may happen that the user does not want the flat panel electronic device 100 to be supported by the supporting apparatus 130, although the abovementioned conditions are met. For example, the hand of the user enters the detectable region proximate to the flat panel electronic device 100 carelessly when the flat panel electronic device 100 is placed on the table, or the user just holds the flat panel electronic device 100 in hand to send messages or performs other operations. In these situations, although the user is in the detectable region proximate to the flat panel electronic device 100, he/she does not want the flat panel electronic device 100 to be supported by the supporting apparatus 130. Thus, in one preferred embodiment as shown in FIG. 2, a state switching apparatus 140 is provided for the flat panel electronic device 100. The state switching apparatus 140 is operable to switch the supporting apparatus 130 between an operable state and a non-operable state. When the supporting apparatus 130 is in the operable state, the control apparatus 120 is operable to control the operation of the supporting apparatus 130 in response to the aforementioned first actuating signal generated by the actuating apparatus 110. When the supporting apparatus 130 is in the non-operable state, the control apparatus 120 is operable to disable the aforementioned first actuating signal. In this case, even if the input apparatus enters the detectable region proximate to the flat panel electronic device 100 and the actuating apparatus 110 also generates the first actuating signal, the control apparatus 120 will not respond to the signal. If the user wants to remain the state of the supporting apparatus 130, they can switch the supporting apparatus 130 into the non-operable state through the state switching apparatus 140. In this way, the flat panel electronic device 100 can be prevented from being disturbed by the instable factors of external environment.

Preferably, as shown in FIG. 2, the supporting apparatus 130 may be operated manually when in the non-operable state. Specifically, when the supporting apparatus 130 is in the non-operable state, the supporting apparatus 130 may be moved to the extending position manually, and moved to the initial position manually. In the preferred embodiment of the invention, the supporting apparatus 130 can be operated manually in the non-operable state and operated automatically in the operable state. In this way, the types of operations are increased, and the influences of the uncontrollable factors on the operations of the supporting apparatus 130 are prevented.

Figure 3:
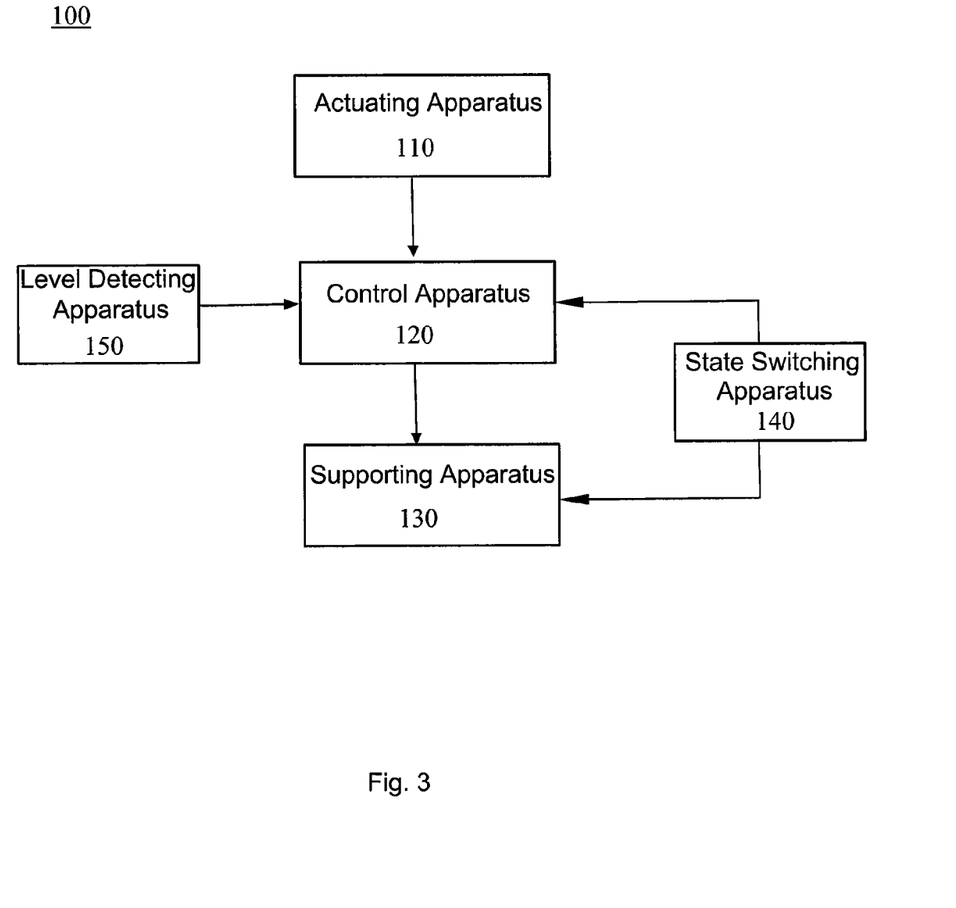
FIG. 3 is a schematic block diagram of the flat panel electronic device in accordance with yet another embodiment of the invention.

To ensure the safety of the flat panel electronic device and avoid the flat panel electronic device from sliding down from the plane when the supporting apparatus 130 moves to the extending position, in one preferred embodiment, a level detecting apparatus 150 may be provided for each embodiment mentioned above. FIG. 3 just illustrates one of the preferred embodiments. The level detecting apparatus 150 is operable to detect an angle between the flat panel electronic device 100 and the horizontal. The control apparatus 120 is operable to disable the first actuating signal received from the actuating apparatus 110 when the angle is more than or equal to a predetermined angle. When the angle between the plane on which the flat panel electronic device 100 is placed and the horizontal is more than or equal to the predetermined angle, the control apparatus 120 does not respond to the first actuating signal and will not control the supporting apparatus 130 to move, even if the input apparatus enters the detectable region proximate to the flat panel electronic device 100 and the actuating apparatus 110 generates the first actuating signal. When the angle between the plane on which the flat panel electronic device 100 is placed and the horizontal is less than the predetermined angle, it indicates that the flat panel electronic device 100 is on the horizontal or the angle of the flat panel electronic device 100 with respect to the horizontal keeps it in safety. In this case, if there is an input apparatus in the detectable region proximate to the flat panel electronic device 100, the control apparatus 120 will control the supporting apparatus 130 to move to the extending position.

The aforementioned predetermined angle may preferably be 5°-15° to ensure the safety of the flat panel electronic device 100. If the angle between the flat panel electronic device 100 and the horizontal is less than the predetermined angle, the control apparatus 120 of the flat panel electronic device 100 can control the operation of the supporting apparatus 130 in response to the first actuating signal. Moreover, the flat panel electronic device 100 can be kept safe. If the angle between the flat panel electronic device 100 and the horizontal is too large, such as larger than 15°, the motion of the supporting apparatus 130 from the initial position to the extending position is likely to cause the flat panel electronic device 100 to slide down from the slope and to be damaged. However, it should be noted that the predetermined angle associates with many factors, such as the roughness of the placed plane, the roughness of the surface of the supporting apparatus 130 contacting with the placed plane, the predetermined height supported by the supporting apparatus 130, the structure of the supporting apparatus 130 and the weight of the flat panel electronic device 100, etc. Consequently, the predetermined angle can be suitably selected from the aforementioned range by those skilled in the art as appropriate.

The aforementioned level detecting apparatus 150 may be any detecting apparatus which can detect the angle between the plane on which the flat panel electronic device 100 is placed and the horizontal. As an example, the level detecting apparatus 150 may be selected from the group comprising a gyro sensor, a gravity sensor and an acceleration sensor.

As mentioned above, when the input apparatus enters the detectable region proximate to the flat panel electronic device 100, the control apparatus 120 controls the supporting apparatus 130 to move to the extending position in response to the first actuating signal generated by the actuating apparatus 120, so that at least a portion of the flat panel electronic device 100 is supported to the predetermined height. However, in practice, there are always noise signals. For example, although the user enters the detectable region, he/she does not really try to pick up the flat panel electronic device 100. In this case, the actuating apparatus 110 is possible to generate the first actuating signal because of the proximity of the user. The control apparatus 120 controls the supporting apparatus 130 to move to the extending position in response to the signal. As a result, it causes the consumption of the power, and also brings trouble to the user. Consequently, it is preferable that the detectable region merely comprises a designated region above a display panel of the flat panel electronic device 100, such as a region above a pattern on the display panel. The pattern indicates the location of the designated region for the user. Only when the input apparatus enters the designated region of the flat panel electronic device 100, the supporting apparatus 130 moves. In this way, the misoperation of the supporting apparatus 130 can be reduced to some extent, and the electrical power can be saved.

Further, the actuating apparatus 110 is preferably operable to generate the first actuating signal when the input apparatus contacts the display panel in the aforementioned designated region. When the user contacts the designated area on the display panel of the flat panel electronic device 100, such as the pattern on the display panel which can indicate the location of the designated area for the user, the actuating apparatus 110 of the flat panel electronic device 100 generates the first actuating signal. This avoids the misoperation of the supporting apparatus 130 further.

The actuating apparatus 110 may be any sensing apparatus which can sense the proximity of the input apparatus. As an example, the actuating apparatus may be selected from the group comprising an infrared sensor, a magnetic sensor and a capacitive sensor. In one embodiment, the actuating apparatus 110 may be an infrared sensor which can detect the proximity of human body. The infrared sensor may emit infrared and determine whether the human body is proximate by means of the reflected infrared. If the human body is proximate, the first actuating signal will be generated. In another embodiment, the actuating apparatus 110 may also be a magnetic sensor which can initiatively produce a magnetic field and detect the change of the magnetic field induced by the approaching input apparatus, such as the human body, etc. In yet another embodiment, the actuating apparatus 110 may also be a capacitive sensor, which can detect the change of the capacitance induced by the approaching input apparatus, such as the human body, etc.

According to another preferred embodiment of the invention, the actuating apparatus 110 may be operated manually by the user to generate the first actuating signal. In one embodiment, the actuating apparatus 110 may be a manually operating apparatus, such as a key or a gear, etc. The manually operating apparatus may be disposed in the flat panel electronic device 100. When the user wants the supporting apparatus 130 of the flat panel electronic device 100 to move to the extending position, he/she can press the key or turn the gear. The actuating apparatus 110 accordingly generates the first actuating signal.

Similarly, it is preferable that the actuating apparatus 110 can also be operated manually by the user to generate the second actuating signal. The control apparatus 120 is operable to receive the second actuating signal, so as to control the supporting apparatus 130 to return to the initial position. Thus, the flat panel electronic device 100 returns to the initial condition.

Figure 4:
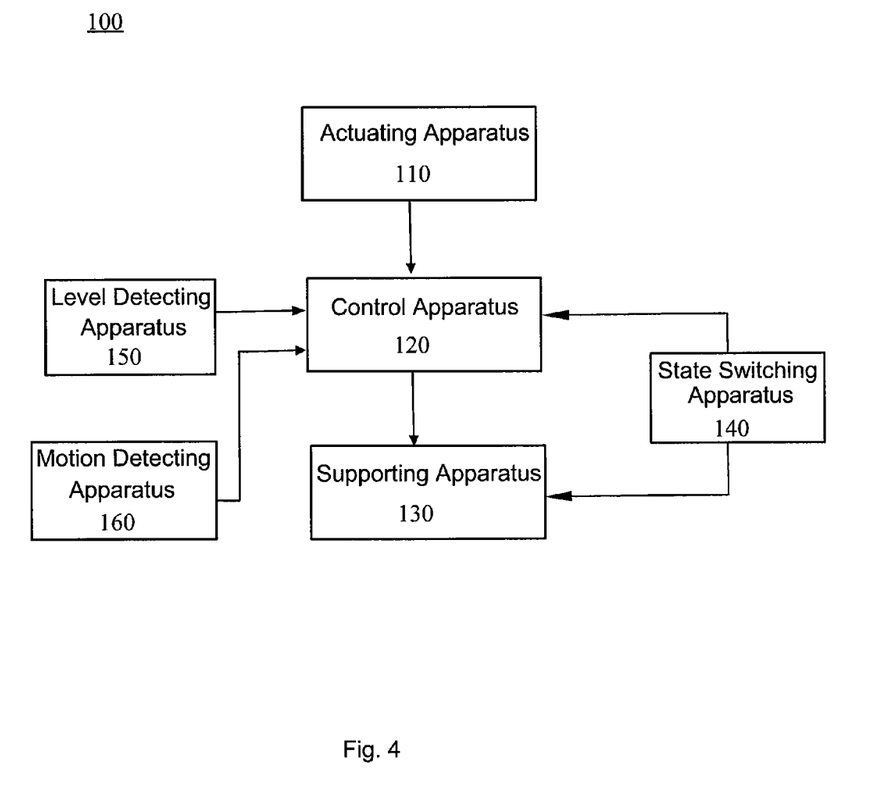
FIG. 4 is a schematic block diagram of the flat panel electronic device in accordance with still another embodiment of the invention.

In practice, the supporting apparatus 130 may not need to be in the extending position after the user picks up the flat panel electronic device 100 from the placed plane. For example, when the user intends to give a call after picking up a mobile phone from the table, the supporting apparatus 130 is needed to return to the initial position. Since the user picking up the flat panel electronic device 100 may cause short motion of the flat panel electronic device, a motion detecting apparatus 160 may preferably be provided for the flat panel electronic device 100 of any aforementioned embodiments which do not conflict mutually. FIG. 4 only illustrates one of the preferred embodiments. The motion detecting apparatus 160 is operable to detect motion of the flat panel electronic device 100 when the supporting apparatus 130 is in the extending position. When the motion detecting apparatus 160 determines that a time of the motion is greater than or equal to a predetermined time, the second actuating signal is generated. The control apparatus 120 is operable to receive the second actuating signal and control the supporting apparatus 130 to return to the initial position. In this way, the supporting apparatus 130 can automatically return to the initial position after finishing the supporting task through detecting the motion of the flat panel electronic device 100. This not only is convenient for operation of the user but also saves the electrical power.

In practice, the time that the user picks up the flat panel electronic device 100 from the placed plane is usually very short. Consequently, the aforementioned predetermined time is preferably 0.5-2 s. In one embodiment, the predetermined time is a value which may be set to factory default levels. It can be suitably chosen from the aforementioned range by those skilled in the art according to the actual situation. In another embodiment, the predetermined time may be set by the user at any time, as needed or desired. Naturally, other time values can also achieve the purpose of the invention. The preferred embodiment of the invention ensures that the control apparatus 120 can control the supporting apparatus 130 to return to the initial position, once the user picks up the flat panel electronic device 100 from the table. It should be noted that a relative long predetermined time is inadvisable. Otherwise it may appear that the supporting apparatus 130 is unable to return to the initial position, because the motion time for picking up the flat panel electronic device 100 is relative short.

In some cases, the motion of the flat panel electronic device is not led by the operation from the user, but led by the motion of environment in which the flat panel electronic device is located. For example, the flat panel electronic device is used in a mobile vehicle. When the supporting apparatus 130 is in the extending position, the user may want to maintain the supporting state. However, the supporting apparatus 130 may return to the initial position, since the flat panel electronic device 100 is moving with the vehicle and the time of the motion exceeds the predetermined time. For the same reason, the supporting apparatus 130 may return to the initial position before the user picks up the flat panel electronic device 100. However, it is contrary with the desire of the user. According to one preferred embodiment of the invention, the motion detecting apparatus 160 may comprise an acceleration sensor. The acceleration sensor is operable to detect the acceleration of the flat panel electronic device 100. Usually, the acceleration direction of the motion is substantially horizontal when the vehicle is moving, which is different with that of the operation from the user. The acceleration sensor is preferably operable to determine that the flat panel electronic device 100 itself is moving when the acceleration is in a predetermined range. The control apparatus 120 thus controls the supporting apparatus 130 to return to the initial position. If the acceleration of the flat panel electronic device 100 is not in the predetermined range, the supporting apparatus 130 maintains in the extending position.

In one embodiment, the supporting apparatus 130 comprises a permanent magnet, and the control apparatus 120 comprises an electromagnet. A pole of the permanent magnet is close to a pole of the electromagnet. The electromagnet is operable to repel the permanent magnet when a forward current flows therethrough. The control apparatus 120 controls the supporting apparatus 130 to move to the extending position and support the flat panel electronic device 100 due to the repulsive force. The electromagnet attracts the permanent magnet when a reverse current flows therethrough. The control apparatus 120 controls the supporting apparatus 130 to return to the initial position due to the attractive force. Preferably, the supporting apparatus 130 comprises a speaker, and the permanent magnet is a magnet in the speaker. In this arrangement, a better sound effect can be produced when the supporting apparatus 130 supports the flat panel electronic device 100. Moreover, the number of the parts can be reduced because they share the same part.

Naturally, other arrangements can also achieve the purpose of the invention. For example, the control apparatus 120 may be a vibrating motor disposed in the flat panel electronic device 100, if the flat panel electronic device 100 has contained a vibrating motor. The vibrating motor may be operable to achieve the vibrating function of the flat panel electronic device 100 when the vibrating motor rotates along the first direction, and support the flat panel electronic device 100 through driving a spiral pillar when the vibrating motor rotates along the second direction. The scheme makes use of the existing apparatus in the present flat panel electronic device, and thus the manufacturing cost can be reduced.

By means of responding to the actuating signal and controlling the supporting apparatus to support at least a portion of the flat panel electronic device to a certain height, the flat panel electronic device can be picked up conveniently from the placed plane as desired. In addition, the supporting apparatus can also have an additional function for adjusting the angle of the display panel of the flat panel electronic device with respect to the user, so as to improve the comfort level for watching.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A flat panel electronic device, the device comprising:
an actuating apparatus configured to generate a first actuating signal;
a supporting apparatus having an extending position and an initial position, wherein the supporting apparatus is configured to support at least a portion of the flat panel electronic device to a predetermined height when the supporting apparatus is in the extending position;
a control apparatus configured to control the supporting apparatus to move to the extending position in response to the first actuating signal, and
a state switching apparatus configured to switch the supporting apparatus between an operable state and a non-operable state,
wherein the control apparatus is configured to not respond to the first actuating signal when the supporting apparatus is in the non-operable state and in the initial position.

2. The flat panel electronic device according to claim 1, wherein the actuating apparatus is configured to detect the presence of an input apparatus and generate the first actuating signal when the input apparatus enters a detectable region proximate to the flat panel electronic device.

3. The flat panel electronic device according to claim 2, further comprising a level detecting apparatus configured to detect an angle between the flat panel electronic device and a horizontal, wherein the control apparatus is configured to disable the first actuating signal when the angle is more than or equal to an predetermined angle.

4. The flat panel electronic device according to claim 3, wherein the predetermined angle is 5°-15°.

5. The flat panel electronic device according to claim 3, wherein the level detecting apparatus is selected from the group comprising a gyro sensor, a gravity sensor and an acceleration sensor.

6. The flat panel electronic device according to claim 2, wherein the detectable region comprises a designated region above a display panel of the flat panel electronic device.

7. The flat panel electronic device according to claim 6, wherein the actuating apparatus is configured to generate the first actuating signal when the input apparatus contacts the display panel in the designated region.

8. The flat panel electronic device according to claim 2, wherein the detectable region is a region that is away from the flat panel electronic device within a predetermined distance, wherein the predetermined distance is 1 cm-3 cm.

9. The flat panel electronic device according to claim 2, wherein the actuating apparatus is selected from the group comprising an infrared sensor, a magnetic sensor and a capacitive sensor.

10. The flat panel electronic device according to claim 1, wherein the supporting apparatus is operable manually when in the non-operable state.

11. The flat panel electronic device according to claim 1, wherein the actuating apparatus is operated manually by a user to generate the first actuating signal.

12. The flat panel electronic device according to claim 11, wherein the actuating apparatus is operated manually by the user to generate a second actuating signal, and the control apparatus is configured to receive the second actuating signal so as to control the supporting apparatus to return to the initial position.

13. The flat panel electronic device according to claim 1, wherein the supporting apparatus comprises a permanent magnet and the control apparatus comprises an electromagnet, wherein a pole of the permanent magnet is close to a pole of the electromagnet, and wherein the electromagnet is configured to repel the permanent magnet when a forward current flows therethrough and attract the permanent magnet when a reverse current flows therethrough.

14. The flat panel electronic device according to claim 13, wherein the supporting apparatus comprises a speaker, and the permanent magnet is a magnet in the speaker.

15. The flat panel electronic device according to claim 1, wherein the control apparatus comprises a vibrating motor disposed in the flat panel electronic device.

16. The flat panel electronic device according to claim 1, wherein the supporting apparatus comprises a speaker.

17. The flat panel electronic device according to claim 1, wherein the device is configured to set the predetermined height based on user input.

18. A flat panel electronic device, the device comprising:
an actuating apparatus configured to generate a first actuating signal;
a supporting apparatus having an extending position and an initial position, wherein the supporting apparatus is configured to support at least a portion of the flat panel electronic device to a predetermined height when the supporting apparatus is in the extending position;

a control apparatus configured to control the supporting apparatus to move to the extending position in response to the first actuating signal; and a motion detecting apparatus configured to detect motion of the flat panel electronic device and generate a second actuating signal when a time of the motion is greater than or equal to a predetermined time, wherein the control apparatus is configured to receive the second actuating signal so as to control the supporting apparatus to return to the initial position.

19. The flat panel electronic device according to claim 18, wherein the predetermined time is 0.5 s-2 s.

20. The flat panel electronic device according to claim 18, wherein the motion detecting apparatus comprises an acceleration sensor.

21. The flat panel electronic device according to claim 20, wherein the acceleration sensor is configured to detect an acceleration of the flat panel electronic device, and the acceleration sensor is configured to determine that the flat panel electronic device is moving when the acceleration is in a predetermined range.

22. A flat panel electronic device, the device comprising:
an actuating apparatus configured to generate a first actuating signal;

a supporting apparatus having an extending position and an initial position, wherein the supporting apparatus is configured to support at least a portion of the flat panel electronic device to a predetermined height when the supporting apparatus is in the extending position; and a control apparatus configured to control the supporting apparatus to move to the extending position in response to the first actuating signal and further configured to control the supporting apparatus to return to the initial position in response to the flat panel electronic device being picked up by a user.

23. The flat panel electronic device of claim 22, further comprising a motion detecting apparatus configured to detect that the flat panel electronic device is picked up by a user by detecting motion of the flat panel electronic device.

* * * * *

UNITED STATES PATENT AND TRADEMARK OFFICE
CERTIFICATE OF CORRECTION

PATENT NO. : 9,746,969 B2
APPLICATION NO. : 13/864835
DATED : August 29, 2017
INVENTOR(S) : Mingyi Yu It is certified that error appears in the above-identified patent and that said Letters Patent is hereby corrected as shown below:

In the Claims

Column 10, Claim 8, Line 26, please delete "1 cm-3 cm" and insert --1cm-3cm--;

Column 11, Claim 19, Line 15, please delete "0.5 s-2 s" and insert --0.5s-2s--.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*